Patented Aug. 17, 1954

2,686,768

UNITED STATES PATENT OFFICE 2,686,768

SUSPENSIONS OF POLYMERIC FLAME-PROOFING COMPOSITIONS CONTAINING PHOSPHATE AND HALOMETHYL GROUPS

John G. Frick, Jr., Metairie, and Jeremiah W. Weaver, New Orleans, La., assignors to the United States of America as represented by the Secretary of Agriculture No Drawing. Application March 28, 1952, Serial No. 279,203

10 Claims. (Cl. 260—29.6)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to non-combustible solid and liquid polymers and to a process of decreasing the combustibility of combustible organic substances. More particularly, the invention provides: relatively stable aqueous suspensions of polymers produced by reacting, under emulsion polymerization conditions, at least one polymerizable, neutral, unsaturated alcohol ester of phosphoric acid with at least one bromo or chloro polyhalomethane; methods of producing such suspensions; and a process of decreasing the combustibility of combustible organic substances.

The flameproofing compositions provided by this invention are particularly effective in reducing the combustibility of organic materials principally composed of cellulosic fibers, e. g., textiles such as cotton, rayon, and the like, braided cellulosic materials such as yarns, ropes, cords, and the like; and matted cellulosic fibrous materials such as paper, cardboard, and the like.

An object of the present invention is to provide a method of producing a flameproofing reagent which can produce a modified cellulosic textile of reduced flammability which will retain its reduced flammability after numerous washings, and which reagent can be applied to textiles without the necessary employment of a combustible solvent. A further object of the invention is to provide a process of producing such a flameproofing reagent by means of a chemical reaction that produces a crude reaction mixture that can be employed per se as the textile flameproofing reagent.

The aqueous suspensions provided by this invention, i. e., relatively stable aqueous suspensions consisting essentially of dispersed phosphate and halomethyl group-containing polymers in mixtures of water and an emulsifying agent, can suitably be prepared by: emulsifying at least one polymerizable, neutral unsaturated alcohol ester of phosphoric acid, at least one bromo or chloro polyhalomethane, a catalytic amount of a water soluble peroxidic polymerization catalyst, and sufficient water and emulsifying agent to form a relatively fluid emulsion which is stable when agitated at the reaction temperature; and agitating the emulsion at a temperature at which the catalyst forms free radicals until the emulsion becomes a suspension containing a dispersed phosphate and halomethyl group-containing polymers.

The combustibility of combustible organic materials can suitably be decreased by the process of this invention by impregating the organic materials with at least one such aqueous suspension and evaporating the volatile components of the suspension, preferably by heating the impregnated material at from about 100 to 140° C. for from about 15 to 30 minutes, with the longer times being used with the lower temperatures. In general such a heating markedly decreases the tendency of the flameproofing agent to be removed by launderings and the like.

It was recently discovered at this laboratory that similar organic polymers containing phosphate and halomethyl groups can be produced by a homogeneous reaction between the same esters and halohydrocarbons, and that such polymers, when uniformly distributed on the surfaces of combustible organic substances decrease the combustibility of the organic substances. The method of producing the polymers by a homogeneous reaction and of using them as flameproofing reagents is described and claimed in the copending application of Jeremiah W. Weaver, Serial No. 253,441, filed October 26, 1951, now abandoned. However, in order to attain a uniform distribution of the polymers produced by such a homogeneous reaction on the surfaces of a combustible organic substance, it is necessary to stop the polymerization reaction at a point at which polymers soluble in the ethylene chloride-methanol azeotrope boiling at about 61° C. are produced, to dissolve the polymers in that or an analogous liquid organic solvent, and to impregnate the textile with an organic solvent solution of the polymers.

We have new discovered that phosphate and halomethyl group-containing polymers capable of flameproofing combustible organic materials can be produced by subjecting the same esters and halohydrocarbons to a heterogeneous reaction in an aqueous emulsion. Unobviously, in the heterogeneous reaction, only a single catalyst is required to produce the polymers; on the other hand, in the homogeneous reaction, in some cases, the use of a Friedel-Crafts type catalyst, in addition to a peroxidic catalyst, is necessary. In addition, the polymers produced in the heterogeneous reaction are so completely dispersed in the aqueous suspension formed by the heterogeneous reaction mixture that combustible fibrous organic substances can be flameproofed by impregnating them with the reaction mixture and using them under the specified conditions. Unobviously, cotton textiles which have been so flameproofed, remain flameproof after numerous washings.

Substantially any polymerizable neutral unsaturated alcohol ester of phosphoric acid can suitably be used in the processes provided by the present invention. A preferred class of such esters consists of trialkenyl phosphates in which three terminally unsaturated allylic radicals are attached to each phosphate radical, i. e., esters such as triallyl, trimethallyl, or triethallyl, and the like phosphates, or diallyl, methallyl, ethallyl dimethallyl, methyl divinyl, and the like mixed phosphates. Triallyl phosphate is typical of such phosphates, and is an ester which is particularly suitable for employment in the present processes.

The polyhalomethanes suitable for employment in the present process are derivatives of methane in which at least two hydrogen atoms are replaced by atoms of chlorine or bromine and may be represented by the formula $CX_2Y_2$ wherein X is chlorine or bromine and Y is hydrogen, chlorine, or bromine. This class of compounds includes compounds of the formula, $CBr_4$, $CBr_3Cl$, $CBr_2Cl_2$, $CBrCl_3$, $CBr_3H$, $CBr_2H_2$, $CCl_4$, $CCl_3H$, and $CCl_2H_2$. Such polyhalomethanes having a molecular weight above 150 have been found to be particularly suitable for employment in the processes of the present invention. Bromine-containing "perhalomethanes" (those in which all of the hydrogen have been replaced by halogen atoms) in which the halogen atoms are chlorine or bromine atoms, i. e., $CBr_4$, $CBr_3Cl$, $CBr_2Cl_2$, and $CBrCl_3$, are especially suitable.

For simplicity of language, the esters of phosphoric acid which can suitably be used in the processes of the invention will hereinafter be referred to by the term, "phosphate," and the polyhalomethanes which can suitably be used will be referred to by the term "halomethane."

Substantially any water soluble peroxidic polymerization catalyst which forms free radicals at a relatively rapid controllable rate of temperatures below about 200° C. can suitably be used in the production of the aqueous suspensions provided by the present invention. Such catalysts include $H_2O_2$, the water soluble persulfates, the water soluble organic hydroperoxide salts, the water soluble organic peracids, and the like peroxidic catalysts. The sodium, potassium and ammonium persulfates are particularly suitable.

Substantially any of the conventional emulsifying agents can suitably be used in the present process. As is known to those skilled in the art, emulsifying agents vary widely in cost as well as in the amount of agent required to emulsify a given mixture of immiscible liquids. Since, in order to obtain a rapid reaction, a reaction medium should be as uniform, as concentrated, and as non-viscous as is possible, the choice of a particular emulsifying agent will depend upon its capacity to produce uniform emulsions when used in quantities not unduly raising the viscosity of the emulsion balanced against the cost of the emulsifying agent and the cost of a slower or less efficient reaction. Suitable emulsifying agents include the polyvinyl alcohols, the sulfated alcohols, dioctyl sodium sulfosuccinate, isopropyl naphthalene sodium sulfonates, ammonium oleate, carboxymethylcellulose, the rosin soaps, and the like emulsifying agents. The polyvinyl alcohols of medium viscosity are particularly suitable.

The reaction time necessary to produce the aqueous suspensions provided by this invention, in each particular case, depends upon the phosphate, the halomethane, and the catalyst used, as well as upon the concentration and proportions of the reactants in the aqueous emulsion constituting the reaction mixture. When the nonaqueous phase of the reaction mixture contains a dispersed polymer containing phosphorous and halogen, the reaction can suitably be terminated. The suitability of the use of longer reaction times is dependent upon the economics of the cost introduced by the additional time and energy spent in using up more of the reactants.

The process of this invention can be conducted in a batchwise or continuous manner. The reaction can suitably be conducted at atmospheric pressure or under superatmospheric pressure.

The proportions of the phosphate and the halomethane reactants can suitably be varied widely. It has been demonstrated that solid phosphorous and halogen containing compositions produced by the process of this invention containing widely varying proportions of phosphorous and halogen are capable of reducing the combustibility of combustible organic materials. In general, the use of from about $\frac{1}{3}$ to $\frac{4}{3}$ mole of the halomethane reactant per mole of the phosphate reactant is preferred.

The proportions of the peroxidic polymerization catalyst can also be varied widely, and the results of using large or small amounts, based on the weight of the polymerizable reactant, are analogous to those generally obtained in emulsion polymerization reactions. The employment of from about 0.01 to 0.03 mole of catalyst per mole of phosphate reactant is preferred.

The proportion of organic reactants and the proportion of emulsifying agent in the aqueous emulsion constituting the reaction mixture can also be varied widely. It is of course advantageous to use as little of the emulsifying agent and water as can be used in producing a relatively fluid emulsion in which the reactants are uniformly mixed. The use of about 1 part of a medium viscosity polyvinyl alcohol in about 100 parts of water emulsified with about 20 parts of organic reactants has been found to be particularly suitable.

The flameproofing compositions provided by this invention are preferably applied to the organic materials to be flameproofed by impregnating the organic materials with the aqueous suspension produced by the above described heterogeneous reaction, and evaporating the volatile components of the suspension at the specified elevated temperature. A relatively large amount of the solid phosphorus and halogen containing compositions can be distributed over the surfaces of the organic material to be flameproofed either by the use of relatively concentrated suspensions containing the dispersed compositions, or by the use of several impregnations of the organic material with more dilute suspensions. The repeated impregnation of a cotton textile with a suspension formed in an emulsion containing about 0.2 part of organic reactants per part of water has proven to be particularly convenient.

As will be apparent to those skilled in the art, if the aqueous suspension of the flameproofing compositions is appreciably acidic, or basic, the suspension should be neutralized by the addition of base or acid before it is applied to a fibrous organic material (particularly before it is applied to a cotton material) to prevent degradation of the organic material. In general the aqueous suspensions produced by the process of this invention are acidic, and their neutralization is preferably accomplished by the addition of a water soluble volatile base such as ammonia and the water soluble amines.

The details of the invention are illustrated by the experiments described in the following examples:

Example I

A mixture of 225 g. triallyl phosphate, 150 g. bromoform., 6 g. potassium persulfate, 15 g. polyvinyl alcohol (medium viscosity) and 1500 ml. water was mechanically stirred until completely emulsified. The mixture was then warmed at 85–90° C. for 4 hours with continuous stirring. The emulsion, which was then acidic, was neutralized with pyridine.

A cotton cloth was dipped in the emulsion, passed through padding rolls to remove the excess, and dried. The dipping and drying process was repeated until the dried cloth had increased in weight by from 25 to 30%. The cloth was then heated at 110° C. for ½ hour.

The treated cloth was flameproof and exhibited little loss of flameproofness after 8 launderings.

Example II 15 g. triallyl phosphate, 8 g. carbon tetrabromide, 0.35 g. potassium persulfate, and 100 ml. of a 1% polyvinyl alcohol solution were sealed in a pressure bottle. The bottle was shaken to emulsify the contents. The bottle containing the emulsion was attached to a rotating wheel to provide continuous agitation and the assembly was placed in a hot air oven set at 90°. After 4 hours the bottle was cooled and its contents were removed.

The contents were neutralized with pyridine and were applied to cloth in the manner described in Example I.

The treated cloth was flameproof.

Example III

Substituting 8 g. dibromodichloromethane for the carbon tetrabromide in the reaction described in Example II produced an aqueous suspension similarly capable of flameproofing cloth.

Example IV

Substituting 8 g. bromotrichloromethane for the carbon tetrabromide in the reaction described in Example II produced an aqueous suspension similarly capable of flameproofing cloth.

We claim:

1. A process of preparing a flameproofing composition comprising subjecting an aqueous emulsion containing (1) a methane derivative of the formula $CX_2Y_2$ wherein X is a member selected from the group consisting of chlorine and bromine and Y is a member selected from the group consisting of hydrogen, chlorine and bromine, (2) a polymerizable, neutral, unsaturated alcohol ester of phosphoric acid, and (3) a water-soluble peroxidic polymerization catalyst as the sole catalyst, to heating at a temperature below about 200° C. at which the catalyst forms free radicals and until the emulsion becomes an equous suspension in which the nonaqueous phase contains a dispersed polymer having phosphate and halomethyl groups.

2. The process of claim 1 wherein the ester of phosphoric acid is a trialkenyl phosphate in which three terminally unsaturated allylic radicals are attached to each phosphate radical.

3. The process of claim 1 wherein the ester of phosphoric acid is triallyl phosphate.

4. The process of claim 1 wherein the methane derivative is bromoform.

5. The process of claim 1 wherein the methane derivative is carbon tetrabromide.

6. The process of claim 1 wherein the methane derivative is dibromodichloromethane.

7. The process of claim 1 wherein the methane derivative is bromotrichloromethane.

8. The process of claim 1 wherein the catalyst is potassium persulfate.

9. The process of claim 1 wherein the ester of phosphoric acid is triallyl phosphate, the methane derivative is bromoform, and the catalyst is potassium persulfate.

10. The process of claim 1 wherein the methane derivative and ester of phosphoric acid are used in the proportions of about from ⅓ to ⅘ moles of the methane derivative per mole of the phosphoric acid ester.

References Cited in the file of this patent

UNITED STATES PATENTS

| Number | Name | Date |
|---|---|---|
| 2,574,515 | Walter et al. | Nov. 13, 1951 |
| 2,576,823 | Francis et al. | Nov. 27, 1951 |
| 2,577,796 | Morris | Dec. 11, 1951 |
| 2,660,543 | Walter | Nov. 24, 1953 |